Figure 1:
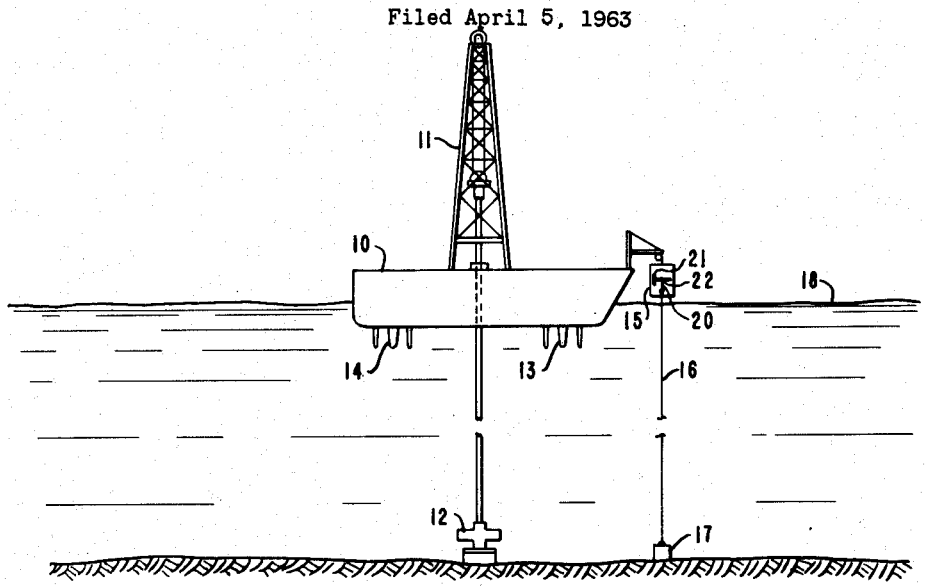

July 14, 1964 H. L. SHATTO, JR 3,140,688
SHIP POSITIONING
Filed April 5, 1963

INVENTOR:
H. L. SHATTO, JR.

HIS ATTORNEY

United States Patent Office 3,140,688
Patented July 14, 1964

3,140,688
SHIP POSITIONING
Howard L. Shatto, Jr., Palos Verdes, Calif., assignor to Shell Oil Company, New York, N.Y., a corporation of Delaware
Filed Apr. 5, 1963, Ser. No. 271,020
7 Claims. (Cl. 114—144)

This invention pertains to automatic ship positioning and more particularly to an automatic ship positioning system utilizing vertical axis propellers.

In a copending application entitled "Ship Positioning," Serial No. 95,601, filed March 14, 1961, there is disclosed and described a ship positioning system utilizing two or more outboard motor propulsion means. The system described determines the position of the vessel relative to a desired position as well as the heading of the vessel relative to a desired heading. Utilizing the difference between the determined values and the desired values the system generates signals that are then vectorially combined to determine the direction in which each of the outboard motors is to be pointed as well as the thrust required of each to return the vessel to the desired position. From the above brief description it is appreciated that the system described in the copending application requires a means for vectorially combining the signals representing the difference between the desired position and the actual position to generate a thrust magnitude and a thrust direction vector for each propulsion unit. While this system has been successfully used it does require a considerable amount of apparatus in order to accomplish the above operations.

Accordingly, it is the principal object of this invention to provide a simplified ship positioning system utilizing vertical-axis propellers that permits Cartesian coordinate vector signals representing the difference between the desired position and the actual position of the vessel to be used directly for controlling the propulsion units.

A further object of this invention is to provide a ship positioning system utilizing vertical-axis propellers that is provided with controls for positioning the steering shaft of the propellers in response to the difference between the actual position of the vessel and the desired position.

A still further object of this invention is to provide a ship control means utilizing vertical-axis propellers in which the steering shafts are moved along two directions or axes at an angle to each other. The directions are preferably aligned with the athwartship and longitudinal axes of the vessel and are positioned in response to the actual position of the vessel with relation to its desired position. Furthermore, the control that actuates the steering shaft of the propellers in one of the two directions is arranged to respond to the difference between the actual heading of the vessel and the desired heading in such a manner as to produce a pure rotational couple on the ship.

The above objects and advantages of this invention are achieved by providing a floating vessel with at least two vertical-axis propellers that are disposed at a distance from the center of rotation of the vessel. These propellers are of the type in which a plurality of blades are rotated about a vertical axis with the pitch of the blades changing as they rotate to provide a net propulsive force for the vessel. By controlling the position at which the pitches of the blades change and the magnitude of the pitch one can control the direction and magnitude of the thrust supplied by the propeller. The invention utilizes two separate positioning yokes that are disposed at an angle to each other to move the steering shaft of the propeller along two directions or axes. Furthermore, the positioning yokes are preferably disposed to move the steering shaft in two directions that are substantially aligned with the athwartships and longitudinal axes of the vessel. The positioning devices accept signals from a detector and controller system that transmits a signal related to the difference between the actual position of the vessel and the desired position in two directions that are substantially aligned with the athwartships and longitudinal axis of the vessel. In addition to accepting these signals the positioning device that moves the steering shaft in a direction aligned with the athwartships axis of the vessel accepts a signal related to the difference between the actual heading of the vessel and the desired heading of the vessel. Likewise, the positioning device that moves the steering shaft in a direction aligned with the longitudinal axis of the vessel may receive a signal that is related to the biasing effect desired of the two propulsion means. The two positioning devices move the steering shaft to cause the propulsion means to generate a thrust having a magnitude and direction sufficient to move the vessel back to the desired position and heading. Thus, the operating apparatus of the propulsion means itself vectorially combines the vectors representing the displacement of the vessel in various directions.

Figure 2:
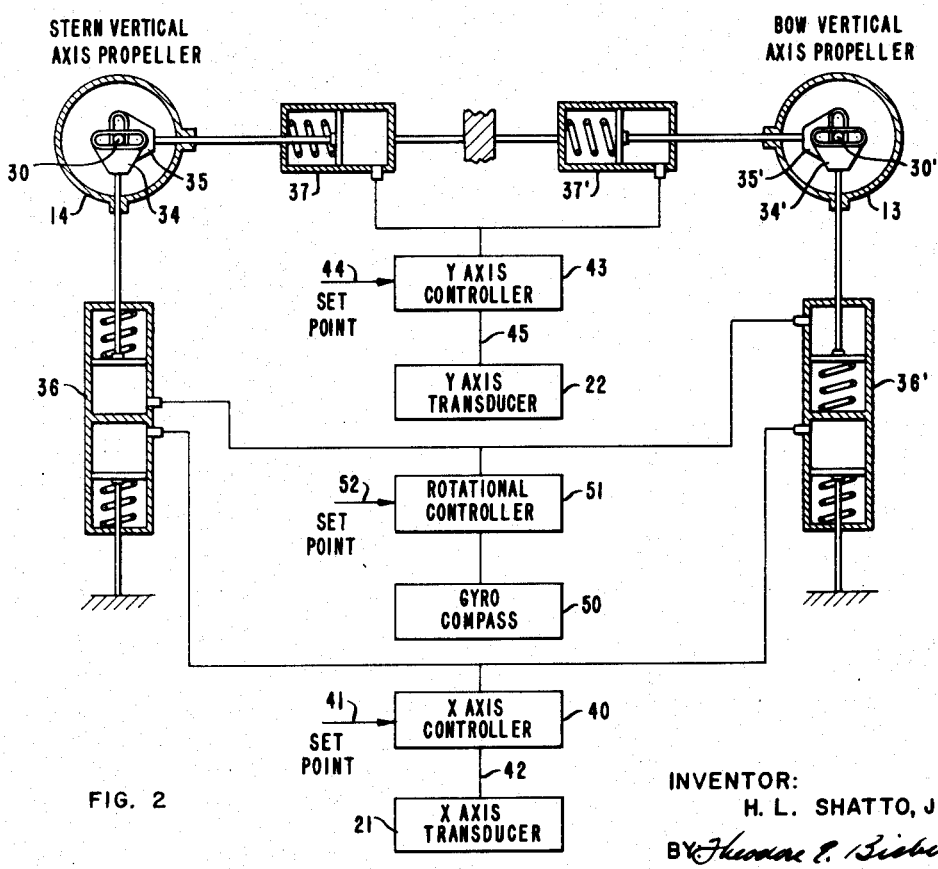

The above objects and advantages of this invention will be more easily understood from the following detailed description of a preferred embodiment when taken in conjunction with the attached drawing, in which:

FIGURE 1 illustrates a floating vessel having two vertical axes propellers disposed thereon and a means for detecting the position of the vessel relative to a desired position, and FIGURE 2 is a block diagram showing the control system of this invention for positioning the steering shaft of the vertical axis propellers.

Referring now to FIGURE 1, there is shown a vessel 10 floating on a body of water 18. The vessel is illustrated as a drilling vessel having a drilling rig 11 mounted on its deck with the vessel in turn positioned over an underwater wellhead 12. Disposed on the vessel are two vertical-axis propeller units 13 and 14. The vertical-axis propeller units are preferably disposed along the longitudinal axis of the vessel and spaced from the center of rotation of the vessel 10. The vessel 10 is to be maintained over the wellhead 12 by operating the vertical axis propeller units to generate thrust vectors having a magnitude and direction sufficient to overcome the forces tending to move the vessel from the wellhead 12.

A tiltmeter means 15 is utilized to detect the position of the vessel 10 relative to the underwater wellhead 12. The tiltmeter 15 detects the inclination of a taut line 16 in two planes disposed at an angle to each other. Preferably, the planes are aligned with the athwartships and longitudinal axes of the vessel 10 and must be essentially in alignment with the movement of the yoke members 34 and 35 described below. The line 16 is attached to an anchor 17 that is disposed on the bottom of the body of water 18 in a position bearing a fixed relationship to the wellhead 12. The tiltmeter 15 may consist of a gimbal pendulum 20 and two transducers 21 and 22. Thus, the transducers 21 and 22 measure the tilt of the pendulum 20 in two planes that as explained above are aligned with the longitudinal and athwartships axes of the vessel 10. The transducers supply electrical signals related to the inclination of the taut line 16 in two planes aligned with the athwartships and longitudinal axes of the vessel. A tiltmeter suitable for this purpose is disclosed and described in a copending application of K. W. Foster, entitled "Position Locating Device," Serial No. 830,604, filed July 30, 1959 now Patent No. 3,121,954.

Referring now to FIGURE 2, there is shown a block diagram of a control system suitable for positioning the steering shaft of the vertical-axes propellers 13 and 14 shown in FIGURE 1. The vertical-axis propellers are normally provided with steering shafts 30 and 30' that position a steering disk off center so that the steering disk turns eccentrically as the propeller is rotated. The propeller is provided with a plurality of blades that are coupled to the steering disk by means of arms. The arms control the pitch of the blade as they rotate around the steering disk. The pitch of the blades changes to generate a net thrust effect in the direction in which the steering arm 30 is moved relative to the center of the propeller. The magnitude of the thrust is related to the amount that the steering shafts 30 and 30' are moved from the center of the propeller. Disposed around the steering shaft 30 are two yoke members 34 and 35 while similar yokes 34' and 35' are disposed around the steering shaft 30'. The yoke member 34 is moved by means of a positioner or actuator 36 while the yoke member 35 is moved by means of a positioner or actuator 37. The yokes 34' and 35' are moved by actuators 36' and 37'. The combination of the two yoke members 34 and 35 and the actuators 36 and 37 permits the steering shaft 30 to be moved in two directions at right angles to each other with the final positioning of the steering shaft 30 being the vector sum of the movement in the two directions. The steering shaft 30' is moved in a similar manner by the yokes 34' and 35' in combination with the actuators 36' and 37'.

The actuators 36 and 36' position the steering shafts 30 and 30' in a direction that is aligned with the athwartships axis of the vessel 10 with this axis being referred to as X axis. The actuators 36 and 36' are preferably actuators that accept input signals to position a piston against a biasing force an amount related to the magnitude of the signals received. One side of the actuator 36 is controlled by the signal received from the X axis controller 40 while the other side of the actuator 36 is controlled by the signal received by the rotational controller 51. Controller 40 is provided with a predetermined set point 41 and receives a signal by means of lead 42 from the X axis transducer 21 mounted on the tiltmeter 15 shown in FIGURE 1. The controller 40 is preferably a controller having in addition to proportional action both rate and reset functions. In addition, the controller 40 is preferably of the type that receives an electrical signal and provides a fluid output signal related to the received electrical signal. Commercial controllers are available that will receive electrical input signals and provide a pneumatic output signal suitable for operating the actuator 36. The rotational controller 51 is also provided with a predetermined set point 52 and an input signal from the gyrocompass 50. In addition, the rotational controller 51 is of a similar construction to the controller 40. The set point 41 represents the desired position of the vessel 10 in an athwartships axis with relation to the location of anchor 17 while the set point 52 represents the desired heading of the vessel 10. Thus, the controller 40 will supply a signal related to the difference between the actual position of the vessel and the athwartships direction and the desired position. The controller 51 will supply a signal related to the difference between the actual heading of the vessel and its desired heading. The signal from the two controllers 40 and 51 will be used to operate the actuator 36 which will move the steering handle 30 in a direction aligned with the athwartships axis of the vessel.

The actuator 36' receives signals from controllers 40 and 51. It should be noted that the signals from controller 40 moves both actuators 36 and 36' in the same direction while the controller 51 moves the actuators in opposite directions. The controller 51 by moving the actuators in opposite directions causes the propulsion units 13 and 14 to generate a rotational couple to effectively rotate the vessel.

The controller 43 is used to operate one side of the actuators 37 and 37' while the biasing means 53 operates the other side of actuators. The actuators 37 and 37' are similar in construction to the actuators 36 and 36'. The controller 43 receives a signal from the Y axis transducer by means of a lead 45 and compares it with a set point 44. The set point 44 represents the desired position of the vessel 10 along the longitudinal or Y axis of the vessel with relation to the location of anchor 17. The controller 43 is identical with the controller 40 and supplies an output signal related to the difference of the actual position of the vessel along the Y axis and the desired position. A biasing means (not shown) may be used to supply a signal to the actuators 37 and 37' in order that the two propulsion means 13 and 14 can operate at low speed in opposite directions in the absence of any other signals. A biasing signal is not always necessary since vertical axis propellers have fast response rates although the use of a biasing signal may be desirable in some cases.

From the above description it is seen that this invention has provided a means by which the vessel 10 remains over a submerged wellhead 12. The vessel utilizes two propulsion means 13 and 14 of the vertical axis propeller type. The propulsion means are disposed along the longitudinal axis of the vessel and spaced from the center of rotation of the vessel. The position of the vessel is determined by means of a tiltmeter 15 and the actual position of the vessel compared with the desired position of the vessel along two axes that are aligned with the athwartships and longitudinal axis of the vessel. The signals resulting from this comparison are then utilized to position the steering arms of the propulsion means in order that the propulsion means may generate a thrust of the proper magnitude and direction to return the vessel 10 to its desired position. In addition the heading of the vessel is compared with the desired heading to position the propulsion means to rotate the vessel back to the desired heading.

While the invention has been described with relation to a drilling vessel that is to be maintained over a fixed wellhead it is easily adapted to position other vessels. In addition to positioning a vessel over desired positions it is also possible to use the control system to move a vessel along a desired course. In addition, other inputs than the input from the tiltmeter may be utilized to determine the actual position of the vessel relative to a desired position. Similarly, modifications may be made in the means for actuating the steering arm of the propulsion means in place of the combination electrical-fluid system described above. Further, multiple propulsion units other than two can be used. Likewise, the control and actuator axes can be at any angle with respect to each other, not solely 90°, and the axes do not have to be aligned with the longitudinal and athwartships axes of the vessel. It is, of course, preferred to align the control and actuator axes with the longitudinal axes of the vessel to simplify the control system.

I claim as my invention:

1. A system for automatically positioning a floating vessel over a desired position comprising:

a plurality of multiple-blade vertical-axis propulsion means disposed on said vessel to propel said vessel, said propulsion means in addition being spaced from the center of rotation of the vessel, and having a steering shaft for controlling the magnitude and direction of thrust supplied by each propulsion unit;

a first sensing and controlling means disposed on the vessel for determining the displacement of the vessel from the desired position in two directions, said directions being aligned with the longitudinal and athwartship axes of the vessel;

a second sensing and controlling means disposed on said vessel for determining the difference between the actual heading of the vessel and the desired heading;

first actuator means coupled to each of said steering shafts to move said steering shafts along a first axis;

second actuator means coupled to each of said steering shafts to move said steering shafts along a second axis at an angle to said first axis;

said first sensing and controlling means being coupled to said first and second actuator means to position said first and second actuator means in response to the displacement of the vessel along the longitudinal and athwartship axes; and said second sensing and controlling means being coupled to one of said actuator means to position said one actuator means in response to the said measured difference between the desired and actual heading of the vessel to give a rotational vector at right angles to a line between the center of rotation of the vessel and the propulsion means.

2. A system for automatically positioning a floating vessel over a desired position comprising:

a plurality of multiple blade vertical axis propulsion means disposed on said vessel to propel said vessel, said propulsion means in addition being spaced from the center of rotation of the vessel, and having a steering shaft for controlling the magnitude and direction of thrust supplied by each propulsion unit;

first sensing means disposed on the vessel for determining the displacement of the vessel from the desired position in two directions, said directions being aligned with the longtudinal and athwartship axes of the vessel;

second sensing means disposed on said vessel for determining the difference between the actual heading of the vessel and the desired heading;

first actuator means coupled to each said steering shafts to move said steering shafts along a first axis;

second actuator means coupled to each said steering shafts to move said steering shafts along a second axis at an angle to said first axis;

a first controller having proportional, rate and reset actions, said first sensing means being coupled to said first controller, said first controller being coupled to said first actuator means;

a second controller having proportional, rate and reset actions, said first sensing means being coupled to said second controller, said second controller being coupled to said second actuator means; and said second sensing means being coupled to said first controller to cause said first actuator means to generate a rotational vector at right angles to a line between the center of rotation of the vessel and the propulsion means in response to the said measured difference between the desired and actual heading of the vessel.

3. A system for automatically controlling a floating vessel comprising:

a plurality of multiple blade vertical axis propulsion means disposed on said vessel to propel said vessel, said propulsion means in addition being spaced from the center of rotation of the vessel, and having a steering shaft for controlling the magnitude and direction of thrust supplied by each propulsion unit;

a first sensing and controlling means disposed on the vessel for determining the displacement of the vessel from the desired position along two directional axes at an angle to each other;

a second sensing and controlling means disposed on the vessel for determining the difference between the actual heading of the vessel and the desired heading;

first actuator means coupled to each of said steering shafts to move said steering shafts along a first axis;

second actuator means coupled to each of said steering shafts to move said steering shafts along a second direction, said second direction being at an angle to said first direction;

said first sensing and controlling means being coupled to both said first and second actuator means to position said first and second actuator means in response to the displacement of the vessel along said to axes; and said second sensing and controlling means being coupled to one of said actuator means to position said one actuator means in response to the difference between the actual and desired heading of the vessel to generate a rotation vector at right angles to a line between the center of the vessel and the propulsion means.

4. The system of claim 3 wherein the two directional axes of the first sensing and controlling means are disposed at right angles.

5. The system of claim 4 wherein the two directional axes of the first sensing and controlling means are aligned with the longitudinal and athwartship axis of the vessel.

6. The system of claim 3 wherein the desired position is an anchored position.

7. A system for automatically positioning a floating vessel over a desired position comprising:

a plurality of multiple-blade vertical axis propulsion means disposed on said vessel to propel said vessel, said propulsion means in addition being spaced from the center of rotation of the vessel, and having a steering shaft for controlling the magnitude and direction of thrust supplied by each propulsion unit;

first sensing means disposed on the vessel for determining the displacement of the vessel from the desired position in two directions, said directions being aligned with the longitudinal and athwartship axes of the vessel;

second sensing means disposed on said vessel for determining the difference between the actual heading of the vessel and the desired heading;

first actuator means coupled to each of said steering shafts to move said steering shafts along a first axis aligned with the longitudinal axis of the vessel;

second actuator means coupled to each of said steering shafts to move said steering shafts along a second axis aligned with the athwartship axis of the vessel;

a first controller, said first sensing means being coupled to said first controller, said first controller being coupled to said first actuator means;

a second controller, said first sensing means being coupled to said second controller, said second controller being coupled to said second actuator means;

third actuator means coupled to each of said steering shafts to move said steering shafts in opposite directions along said second axis aligned with the athwartship axis of the vessel;

a third controller, said second sensing means being coupled to said third controller, said third controller being coupled to said third actuator means.

No references cited.